(12) United States Patent
Martin

(10) Patent No.: US 7,976,725 B2
(45) Date of Patent: *Jul. 12, 2011

(54) CYCLIC PROCESS FOR THE EFFICIENT GENERATION OF CHLORINE DIOXIDE IN DILUTE SOLUTIONS

(75) Inventor: Roy William Martin, Downers Grove, IL (US)

(73) Assignee: Truox, Inc., McClellan, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 12/319,578

(22) Filed: Jan. 9, 2009

(65) Prior Publication Data

US 2009/0136597 A1 May 28, 2009

Related U.S. Application Data

(63) Continuation-in-part of application No. 12/317,010, filed on Dec. 18, 2008, which is a continuation-in-part of application No. 11/598,384, filed on Nov. 13, 2006, now Pat. No. 7,794,607, which is a continuation-in-part of application No. 11/494,228, filed on Jul. 27, 2006, which is a continuation-in-part of application No. 11/226,100, filed on Sep. 14, 2005, which is a continuation-in-part of application No. 11/158,676, filed on Jun. 22, 2005, now Pat. No. 7,476,333.

(51) Int. Cl.
*C01B 11/02* (2006.01)
*C01B 11/10* (2006.01)
*C01B 7/09* (2006.01)
*C02F 1/76* (2006.01)

(52) U.S. Cl. ............ 252/187.21; 252/187.1; 252/187.2; 252/187.32; 252/187.33; 252/187.34; 252/175; 252/180; 252/181; 252/186.33; 210/754; 210/755; 210/756; 210/759; 210/763

(58) Field of Classification Search ............... 252/187.2, 252/187.21, 187.23; 210/754, 755, 756, 210/758
See application file for complete search history.

(56) References Cited

U.S. PATENT DOCUMENTS

| | | | | |
|---|---|---|---|---|
| 3,754,081 | A * | 8/1973 | Partridge et al. | 423/520 |
| 5,208,057 | A * | 5/1993 | Greenley et al. | 426/332 |
| 5,464,636 | A * | 11/1995 | Hight et al. | 424/661 |
| 5,603,840 | A * | 2/1997 | Strittmatter et al. | 210/698 |
| 5,858,246 | A * | 1/1999 | Rafter et al. | 210/754 |
| 6,303,038 | B1 * | 10/2001 | Sanders et al. | 210/754 |
| 7,449,119 | B2 * | 11/2008 | Brown | 210/753 |
| 7,572,384 | B2 * | 8/2009 | Martin | 210/759 |
| 7,572,390 | B2 * | 8/2009 | Martin | 252/186.33 |
| 7,794,607 | B2 * | 9/2010 | Martin | 210/759 |
| 2003/0080317 | A1 * | 5/2003 | Speronello et al. | 252/175 |
| 2006/0016765 | A1 * | 1/2006 | DiPietro et al. | 210/754 |

(Continued)

FOREIGN PATENT DOCUMENTS
WO  WO 2007/078838 A2 *  7/2007

*Primary Examiner* — Joseph D Anthony

(57) ABSTRACT

An efficient cyclic process and related compositions for the in-situ generation of chlorine dioxide from dilute solutions of chlorite anions at near neutral pH. The cyclic process provides a means of safe and effective use of chlorine dioxide with reduced concern of chlorite accumulation in the aqueous system. The disclosed chemistry used to support the cyclic process can be applied independently or in various combinations that are effectively inert. This dramatically reduces safety concerns since the chlorine dioxide is produced in-situ to the application and in dilute concentrations. Also, the process allows for regeneration of inert anions such as bromide and chlorite thereby reducing operating cost.

17 Claims, 1 Drawing Sheet

U.S. PATENT DOCUMENTS

| | | | |
|---|---|---|---|
| 2007/0023357 A1* | 2/2007 | Brown | 210/668 |
| 2007/0116636 A1* | 5/2007 | Hemker et al. | 423/477 |
| 2007/0193958 A1* | 8/2007 | Martin | 210/749 |
| 2008/0299161 A1* | 12/2008 | Sanderson | 424/408 |
| 2009/0136597 A1* | 5/2009 | Martin | 424/661 |
| 2009/0145857 A1* | 6/2009 | Martin | 210/754 |
| 2009/0185970 A1* | 7/2009 | Sanderson | 423/477 |
| 2009/0232903 A1* | 9/2009 | Sanderson | 424/601 |
| 2010/0189630 A1* | 7/2010 | Martin | 423/477 |

* cited by examiner

CYCLIC PROCESS FOR THE EFFICIENT GENERATION OF CHLORINE DIOXIDE IN DILUTE SOLUTIONS

CROSS-REFERENCE TO RELATED APPLICATIONS

This application is a continuation-in-part of application Ser. No. 12/317,010 filed Dec. 18, 2008, which is a continuation-in-part of application Ser. No. 11/598,384 filed Nov. 13, 2006 now U.S. Pat. No. 7,794,607, which is a continuation-in-part of application Ser. No. 11/494,228 filed Jul. 27, 2006, which is a continuation-in-part of application Ser. No. 11/226,100 filed Sep. 14, 2005, which is a continuation-in-part of application Ser. No. 11/158,676 filed Jun. 22, 2005 now U.S. Pat. No. 7,476,333. The priority applications are expressly incorporated by reference herein in their entirety.

BACKGROUND OF THE INVENTION

1. Field of Invention

This invention relates to a cyclic process for enhanced sanitation and oxidation of aqueous solutions such as: aquatic facilities, cooling systems, vegetable washing systems, poultry washing systems and laundry washing machines.

2. Background of the Technology

Aqueous system that are exposed to various forms of oxidant demand as well as introduction of microbiological contamination must be effectively treated to control transfer of disease such as in the case of a swimming pool and fouling such as in the case of an industrial cooling system.

Chlorine dioxide has been proven very effective at inactivating microbiological organisms in such applications. However, generating chlorine dioxide can be hazardous due to the explosive nature of the gas as well as the potential for human exposure to toxic concentrations. Furthermore, chlorite anion concentrations must be held to a minimum in water that may be consumed due to toxicity concerns. The U.S. EPA has put a limit in drinking water at 1.0 ppm as chlorite anion.

Chlorine dioxide is typically produced in a chlorine dioxide generator where either acid or chlorine are combined with a chlorite donor to generate chlorine dioxide. In order to achieve efficient conversion of chlorite to chlorine dioxide, high concentrations are reacted thereby generating a high concentration of gas which is potentially dangerous.

Chlorine dioxide is also produced by forming tablets from reactive components such as dichloroisocynauric acid and sodium chlorite or an acid source and sodium chlorite. These also have limitations and also have the concern of producing chlorine dioxide gas premature to the application due to exposure to relative humidity.

Regardless of these efforts to efficiently and safely produce chlorine dioxide, the efficiency of chlorite conversion from tablets is commonly less than 70%, and the hazards of producing concentrated solutions remains. In the case of reacting liquid forms of acid and sodium chlorite, the low pH of the solution requires neutralization.

Using these methods of chlorine dioxide generation also waste considerable amounts of reagents such as chlorite as well as elevate cost due to the inability to regenerate the chlorite ions that result from the reduction of the chlorine dioxide back to chlorite or the residual chlorite that was not activated during the initial formation of chlorine dioxide.

3. Prior Art

U.S. Pat. No. 5,603,840 comprises adding bromide to a cooling water system containing corrosion and scale control treatment chemicals at elevated concentrations (40 ppm or greater). A fraction of the recirculating water is drawn off in a side stream and ozonated. Ozone oxidizes bromide to bromine which then serves as a biocide. The bromide levels are chosen such that the ozone/bromide reaction is preferred over the ozone/treatment chemicals reaction. Thus, the addition of bromide at elevated concentrations, while acting as a biocide precursor, serves to protect treatment chemicals necessary for corrosion and scale control.

Publication No. WO2007/078838 A2 discloses a solid composition comprising a solid source of hypobromous acid and a solid source of chlorite to produce chlorine dioxide. The composition has a pH of 5-9 at 25° C. when dissolved at a concentration of 1 gram per 100 ml water.

Publication No. U.S. 20030080317 discloses a massive body that uses chlorine, an acid and chlorite to produce chlorine dioxide.

4. Discussion of Prior Art

The tablet technologies disclosed in Publication No. WO2007/078838 A2 and Publication No. U.S. 2003/0080317 clearly illustrate thru the examples provided the inability to produce a solution substantially free of chlorite, even when utilizing a system that provides a high concentration of reactants to maximize efficiency of the chlorite conversion.

The application of chlorine dioxide using these prior art methods lends itself to the potential accumulation of chlorite anions when applied to recirculating aqueous systems. This is the result of the prior arts inability to effectively achieve near 100% conversion of chlorite anion to chlorine dioxide in the resulting solution, and has no provision for effectively regenerating chlorite anions resulting form the reduction of chlorine dioxide once the solution is applied to the said aqueous system. Therefore chlorite anions will accumulate.

Since many applications limit the amount of chlorite anion that can be present in the water, it is desirable be able to limit the accumulation to levels to less than about 1.0 ppm as $ClO_2^-$. This criteria would therefore substantially limit or altogether prohibit the use of chlorine dioxide generated by these prior art methods in such systems.

In order to sustain chlorine dioxide concentrations without accumulating chlorite anions above about 1.0 ppm as $ClO_2^-$, regeneration of a dilute solution comprising chlorite anions back to chlorine dioxide under the conditions of the aqueous system is required.

However, in some applications such as poultry washing systems or laundry washing machine wash water where excess chlorite maybe acceptable, it will be desirable to safely and efficiently sustain a desired concentration of chlorine dioxide to enhance disinfection in the case of the poultry washing and oxidation along with disinfection in the case of washing machine wash water. The cyclic process of the invention provides a means of safely generating and sustaining the desired concentration of chlorine dioxide in such applications, without the need for special handling since the chlorine dioxide is produced in dilute solution in-situ to the application. Concern of tablet dissolution to prevent bleaching of laundry etc can be effectively eliminated since the chlorine dioxide is produced after being dispersed wash water. The potential for localized high concentrations in averted.

Also, the need for continued replenishment of chlorine dioxide solution from the tablet or methods using generators is altogether eliminated since surrogate anions of chlorine dioxide and hypobromous acid are regenerated in the process back to their respective oxyhalogen's. Only enough supplemental supply of bromide and chlorite anions is required to sustain the cyclic process. Tremendous cost saving, simplicity in operation, and safety are significant benefits.

SUMMARY OF THE INVENTION

The disclosed invention is based on the discovery that efficient in-situ generation of chlorine dioxide occurs at low concentrations of chlorite anions and at near neutral pH by reaction with hypobromous acid. Hypobromous acid can be produced by the activation of bromide ions to form hypobromous acid in-situ to the application. Activation of hypobromous acid can be performed by reacting bromide anions with at least one of: potassium monopersulfate, a peroxymonosulfate donor, a sulfate free radical, a hydroxyl radical, or free available chlorine.

Efficient regeneration of relatively low concentrations of chlorite anions at near neutral pH opens the pathway for sustaining a cyclic system resulting in recycling of substantially inert anions into powerful and effective oxidants and disinfectants. The cyclic system is achieved by the process of providing an effective amount of oxidizing activator such as potassium monopersulfate or free chlorine to an aqueous system while sustaining in said aqueous system an effective amount of bromide anions and chlorite anions. The chlorite anions are then regenerated into chlorine dioxide by oxidation from hypobromous acid. The concentration of chlorite anions can be controlled at less than about 1.0 ppm by maintaining an effective residual of hypobromous acid whenever chlorine dioxide is present in the aqueous system.

Of tremendous benefit is the ability to cost effectively and safely produce chlorine dioxide without the need for combining active ingredients such as in the case of a solid tablet, or generating high concentrations such as in the case of on-site generators. The toxic nature or chlorine dioxide as well as its potential explosive properties in high concentration make it very advantageous to efficiently produce chlorine dioxide in-situ using dilute solution of the reactants.

Figure 1:
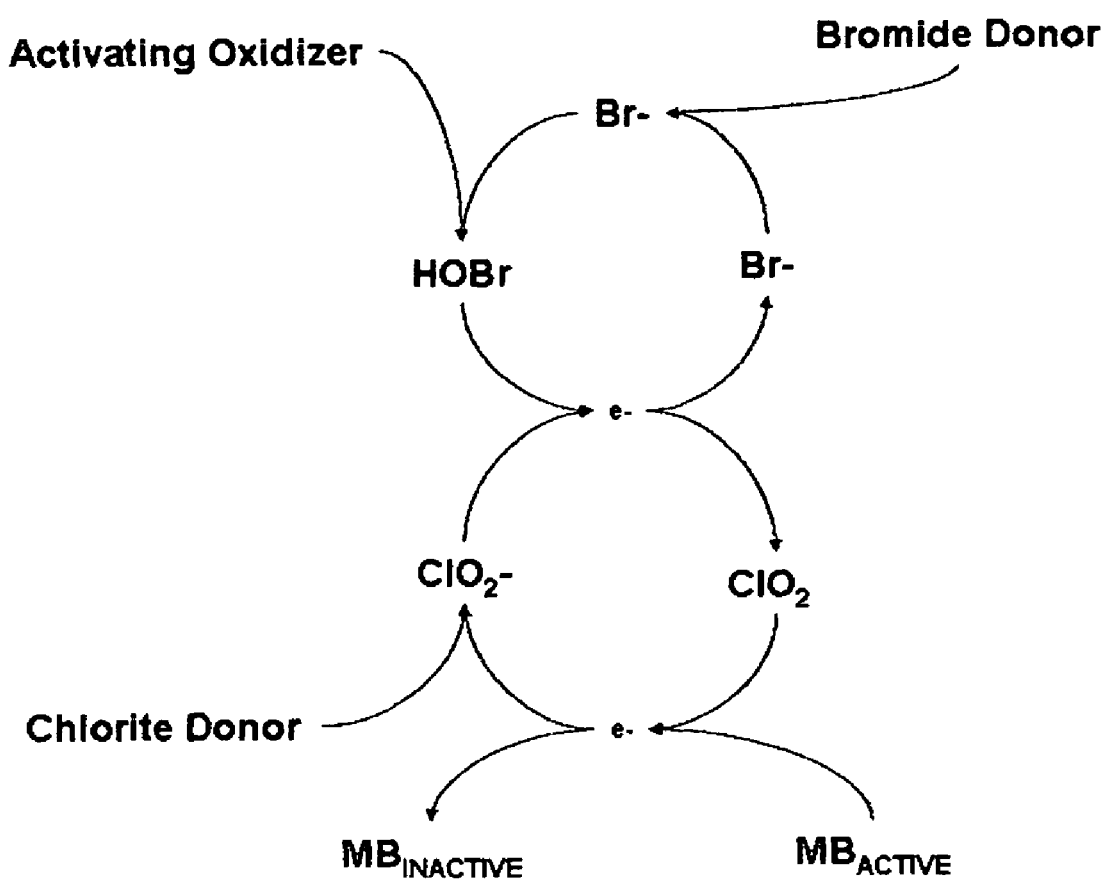
FIG. 1 illustrates the cyclic process where the "activating oxidizer" is applied at a rate sufficient to sustain the desired residual of hypobromous acid by reacting with bromide anion (Br—) to produce hypobromous acid (HOBr). The HOBr reacts with chlorite anion ($ClO_2$—) resulting in the production of chlorine dioxide ($ClO_2$) and reduction of HOBr to Br— which is then recycled in the process. Chlorine dioxide reacts with active microbiological organism ($MB_{ACTIVE}$) resulting in reduction of the chlorine dioxide back to chlorite anion and inactive microbiological organism ($MB_{INACTIVE}$). The recovered Br— and $ClO_2$— are regenerated in the process in a cyclic process. Oxidizing activator is added to initiate the cyclic process by generating hypobromous acid from residual bromide anion and is applied at a rate sufficient to achieve the desired residual of hypobromous acid. Supplemental chlorite donor and bromide donor are added to sustain the specified conditions for chlorine dioxide concentration and bromide ion concentration since there will be water losses and potential for decomposition of chlorine dioxide to chlorate such as in the case of exposure to UV light.

Note that since the majority of chlorite anion is converted to chlorine dioxide as long a sufficient residual of hypobromous acid exist, very little chlorite anion will be in the aqueous system. As a result, the supplemental feed rate of chlorite donor can be adjusted based on the measured residual of chlorine dioxide (i.e. when the chlorine dioxide concentration is low, there is not enough chlorite anion present to sustain chlorine dioxide concentration as long as the specified residual of free bromine exist within the specified pH range).

DETAILED DESCRIPTION OF THE INVENTION

Various compositions and methods of the invention are described below. Although particular compositions and methods are exemplified herein, it is understood that any of a number of alternative compositions and methods are applicable and suitable for use in practicing the invention.

The practice of the present invention will employ, unless otherwise indicated, conventional techniques of water chemistry, which are known to those of skill in the art. Such techniques are explained fully in the literature.

DEFINITIONS

Unless otherwise indicated, all terms used herein have the same meaning as they would to one skilled in the art and the practice of the present invention will employ, conventional techniques of microbiology and recombinant DNA technology, which are within the knowledge of those of skill of the art.

As used herein, the term "oxidizing activator" is used with reference to an oxidizer selected from at least one of: free chlorine, peroxymonosulfate, and alkali metal salts or ammonium salts of persulfates; wherein when the activating oxidizer is introduced to the aqueous system comprising bromide anions, the activating oxidizer reacts with bromide anion resulting in the formation of hypobromous acid.

As used herein, the term "free chlorine" is used with reference to a chlorine source that hydrolyses in the aqueous system to produce at least some portion of hypochlorous acid.

As used herein, the term "free bromine" is used with reference to the formation or presence of hypobromous acid and possibly some portion of hypobromite ions.

As used herein, the term "dilute solution of chlorite anions" is used with reference to the aqueous system comprising no more than about 100 ppm as $ClO_2^-$ that are effectively dispersed in the aqueous system where they react with hypobromous acid resulting in the production of chlorine dioxide in-situ to the aqueous system. To further clarify, the chlorite anions are not held in close proximity such as in the case of a tablet or confined such as in the case of a reactor, reacted to produce chlorine dioxide then dispersed. The chlorite anions are effectively dispersed in the aqueous system before they are reacted by hypobromous acid to produce chlorine dioxide.

As used herein, the term "efficient conversion" is used with reference the ability of the cyclic process to convert at least 50 wt % of the chlorite anions in the aqueous system to chlorine dioxide.

As used herein, the term "near neutral pH" is used with reference the pH of the aqueous system of between about 6.0 and 8.5. However, more preferred is a pH of about 6.8 to 8.0 where the ratio of hypobromous acid as compared to hypobromite ions is low, and the potential for formation of bromine gas is reduced.

As used herein, the term "effective amount of bromide anion and chlorite anion" is used with reference to sustaining at least a stoichiometric concentration of bromide anion in relation to the concentration of chlorite anion. To further reduce the concentration of chlorite anion in the aqueous system and improve the conversion efficiency, the bromide ion concentration will be supra-stoichiometric to the concentration of chlorite anion.

As used herein, the term "sustaining a chlorite anion concentration of no greater than 50 wt % of the concentration of measured chlorine dioxide" means the remaining concentration of chlorite anions in the aqueous system is less than 50 wt % of the total combined concentration of chlorite anions and chlorine dioxide. For example, if the concentration of chlorine dioxide measured as $ClO_2$ is 0.5 ppm the chlorite anion concentration will not exceed 0.5 ppm as $ClO_2^-$.

As used herein, the term "inactivation" is used with reference to the ability to deactivate, kill, or destroy an organism.

As used herein, the term "enhanced inactivation" is used with reference to the ability to deactivate, kill, or destroy a microbiological organism at a higher rate than that obtained while sustaining an equivalent concentration of free halogen.

As used herein, the term "rate of inactivation" means the time based measurement required to achieve a level of inactivation of an organism. An increased rate of inactivation means the time required to deactivate, kill, or destroy an organism is reduced.

As used herein, the term "pH buffering agent" is used with reference to chemical that alters the ratio of hydrogen ions and hydroxide ions in the solution to affect the pH in a desired manor. Various phosphates, borates, carbonates are examples of pH buffers. It will be understood that any buffer used by those of skill in the art to obtain and maintain desired solution pH may be used in the practice of the invention. For example, addition of sodium carbonate (soda ash) to a composition comprising potassium monopersulfate will result in a solution with reduced free acidity. The carbonate alkalinity consumes excess acidity resulting in an elevation in solution pH.

As used herein, the term "barrier film" is used with reference to an additive used to segregate at least two components of a composition that maybe considered incompatible. Such incompatibility may be due to sensitivity to opposing pH, moisture, and/or reactivity. The type of barrier film, if at all required, is selected based on the nature of the components in the composition and their respective detriment to the composition, i.e. stability, reactivity, Department of Transportation (DOT) regulations, impact of composition performance and the like). Ideally barrier films not only substantially reduce the detrimental effects, but can also enhance the processing, handling, packaging requirements, DOT classification, storage, as well as performance of the composition in a given application. One example includes adding magnesium carbonate to sodium chlorite to reduce the reactivity of the sodium chlorite while effectively functioning as a enhancing flow of the powder and providing anti-caking characteristics to the blend.

As used herein, the term "increased the rate of inactivation" means the time required to deactivate, or kill the microbiological organisms for a given concentration of free available chlorine or bromine is increased by uses the compositions and/or processes disclosed in the invention.

As used herein, the term "microbiological organisms" is used with reference to all forms of microbiological life forms including: parasites, bacteria, viruses, algae, fungus, and organisms encased in biofilms.

As used herein, the term "free halogen donor" is used with reference to a halogen source which acts as an active oxidizer when dissolved in water. Chlorine based free halogen donors form at least one of ($Cl_2$, HOCl, OCl$^-$) when added to water, whereby the species formed is pH dependent. Bromine based free halogen donors form at least one of ($Br_2$, HOBr, OBr$^-$), again the species being pH dependent.

As used herein, the term "peroxymonosulfate" encompasses the various species of the peracid chemistry and its various salts, whereby depending on the pH of the solution in which the peroxymonosulfate is added, the following species and combinations result: $H_2SO_5$ (Caro's acid), $HSO_5^-$, $SO_5^=$.

As used herein, the term "alkali metal salts of monopersulfate" includes but is not limited to potassium monopersulfate, and/or sodium monopersulfate. Potassium monopersulfate is commercially available under the trade names Caroat® (Degussa Initiators GmhB) and Oxone® (E.I. DuPont). Synonyms include peroxymonosulfate.

"Monopersulfate donor" can be any convenient source of monopersulfate. Monopersulfate dissolved in water forms $HSO_5^-$, and/or $SO_5^=$ ions depending on solution pH.

As used herein, the term "aquatic facility" is used with reference to all structural components and equipment in contact with the water from an aqueous system. Examples of aquatic facilities include, but are not limited to, water parks, theme parks, swimming pools, spas, mammal habits at zoos, features such as fountains, waterfalls and the like.

As used herein, the term "Aquatic Facility Circulating System" as defined inhere is part of the aqueous system of the aquatic facility comprised of at least: a contained body of water such as a pool, a means of collecting surface water (such as a gutter or skimmer system), a "main drain" which collects water from the bottom of the aqueous system, pipes to transport the said collected water(s) to a pumping system comprised of at least a pump, a filter system to remove water insoluble matter, and a piping return system that returns the circulated water back to the contained body of water (pool).

As used herein, the term "free flowing powder" means the composition(s) have a consistency of a pourable powder and/or granules.

As used herein, the term "cyclic process" relates to the recycling of substantially inert anions comprising bromide, and chlorite into their oxyhalogen surrogates, exemplified by hypobromous acid, and chlorine dioxide respectfully.

As used herein, the term "chlorite anion donor" is a compound that comprises an alkali metal salt comprising chlorite anions $ClO_2^-$, chlorine dioxide, or any convenient direct or indirect source of chlorite anions. For example, chlorine dioxide can indirectly produce chlorite due to reduction in an aqueous system. Sodium chlorite directly supplies chlorite anions. Regardless of whether the chlorite anion is provided by a direct or indirect chlorite anion donor, any chlorite anions in the aqueous system implementing the disclosed cyclic process of the invention will be regenerated to chlorine dioxide in the disclosed cyclic process.

As used herein, the term "chlorite anion" is comprises chlorite having the general formula $ClO_2^-$.

As used herein, the term "recycled" means at least some portion of the recovered bromide anions and chlorite anions are regenerated to their respective oxyhalogen compounds, followed by reduction back to their respective anions, and where the process is repeated.

As used herein, the term "shock" represents a level of treatment applied to the aqueous system in a short period of time to quickly elevate the concentration of chlorine dioxide to greater than about 0.8 ppm for a relatively short duration, typically less than 8 hours, but potentially as long a 48 hours. A feed system can be used to apply a "shock" level of treatment however more common practices include broadcasting or decanting the chemicals all at once or in rapid succession to produce a high concentration in a short period of time.

As used herein, the term "substantially free of chlorite anions" means the aqueous system has a chlorite anion concentration being the lesser of: about 1.0 ppm of chlorite anions measured as $ClO_2^-$, or a concentration of chlorite anions in the aqueous system of less than 50 wt % of the total combined concentration of chlorite anions and chlorine dioxide.

As used herein, the term "recirculating aqueous system" describes any water system that circulates and treats the water of the aqueous system in order to conserve the water, and where the treatment of the said water with a chlorine donor such as chlorine dioxide can concentrate the chlorite anions in the water.

As used herein, the term "reducing agent" is a chemical that reduces oxidizers such as the activating oxidizers and chlorine dioxide disclosed as part of cyclic process. Examples include but are not limited to: sodium thiosulfate, sodium sulfite.

As used herein, the term "cooling tower" represents an open recirculating system have a tower that forms fine water droplets and exposing them to flowing air to evaporate latent heat.

As used herein, the term "vegetable washing system" represents a basin or any reservoir including a spray collection basin wherein vegetables are immersed or sprayed with an aqueous solution to remove unwanted contaminants.

As used herein, the term "poultry washing system" represents a basin or any reservoir including a spray collection basin wherein poultry are immersed or sprayed with an aqueous solution to remove unwanted contaminants.

As used herein, the term "chelating agent" describes a ligand bearing compound that increases the solubility of a metal in water. Examples include Dow Chemical's Versenex®, Versene®, and Solutia's Dequest® series of chelants.

DETAILED DESCRIPTION OF THE EMBODIMENT(S)

Bromide anions can be provided indirectly from free bromine donors such as dibromo-dimethyl-hydantoin (DB-DMH), bromo-chloro-dimethyl-lhydantoin (BCDMH) and other free bromine donors stabilized with hydantoin, cyanuric acid, and the like. While these initially do not provide bromide anions, the reduction of the free bromine results in the formation of bromide anions. Direct addition of alkali metal salts of bromide are effective bromide anion donors such as sodium bromide. In simplified terms any direct or indirect source of bromide anions is to be considered an effective source of bromide anion including use of sea-water. To ensure efficient conversion of chlorite anions to chlorine dioxide, sufficient residual free bromine is required to drive the reaction toward completion. This in turn requires at least a minimal requirement of bromide anions present to ensure the activating oxidant is substantially consumed to produce a residual of free bromine.

While stabilized forms of free bromine donors can be used as a bromide anion source, it is desirable to limit the concentration of hydantoin and cyanuric acid in systems such as aquatic facilities. Also the cost of using stabilized forms of free halogen donors can be several times higher than the cost of alkali salts of bromide such as sodium bromide. It is therefore preferred to supply bromide donors in the form of an alkali salt of bromide. The preferred alkali salt is sodium bromide. However other alkali salt forms of bromide anion can be used in place of sodium bromide.

The use of free chlorine donors in aquatic facilities is widespread however it is notorious for producing chloramines and trichloromethanes. Also as a disinfectant its performance is compromised by the presence of organic contaminants that impose demand on the chlorine thereby reducing the aqueous systems oxidation potential.

As an activator free chlorine demonstrates poor conversion efficiency for converting dilute solutions of chlorite anions to chlorine dioxide as illustrated in example 1. This severe limitation is clearly illustrated in the numerous prior art for tablets which are designed to maintain high concentrations of reactants such as free chlorine, acid, and chlorite anions to generate chlorine dioxide with improved chlorite conversion efficiency.

However, it has been found that when free chlorine is applied to an aqueous system treated with an excess of bromide anions and a desired concentration of chlorite anions, the free chlorine effectively converts the bromide to free bromine, which in turn activates the chlorite anions into chlorine dioxide with greatly improved efficiency. Depending on the concentration of bromide ion, it has been observed that the disclosed cyclic process can sustain elevated concentrations of chlorine dioxide while sustaining a minimal residual of chlorite anions. A 60% to near 100% conversion of chlorite to chlorine dioxide can be achieved using the disclosed cyclic process.

This surprising observation opens the pathway to operating an extremely safe oxidizing system that eliminates the need for direct generation of chlorine dioxide by combining the reactants to produce chlorine dioxide prior to its application. The various reagents can be applied separately or in various combinations that eliminate the concerns and expense of packaging and feeding compositions that directly produce chlorine dioxide.

Another benefit of using the cyclic process of the invention is that the reduced oxidants such as chlorine dioxide and the free bromine can be efficiently regenerated in-situ to the aqueous system, thereby dramatically reducing cost, and/or allowing higher concentrations of chlorine dioxide to be sustained without the concern of achieving high concentrations of chlorite.

Furthermore, by sustaining an excess of free bromine very little chlorite exist in the aqueous system. Also by sustaining an excess of bromide ions in the aqueous system, a high percentage of free chlorine applied to the aqueous system is consumed converting bromide to free bromine. This effectively reduces the potential for forming more volatile chlorinated byproducts such as chloramines, and also elevates oxidation potential, as well as reducing the potential for chlorate formation by reaction between residual free chlorine and chlorite anion.

Further still, the cyclic process of the invention eliminates the need for a reactor for the generation of chlorine dioxide. A reactor or any sort such as a vessel or tablet whereby a high concentration of reactants is introduced or sustained in order to achieve an increased yield of chlorite to chlorine dioxide. The disclosed process of the invention allows greater than 50 wt % conversion of chlorite anion, more preferably 70 wt % conversion of chlorite anion, and most preferably greater than 80 wt % conversion of chlorite anion to chlorine dioxide in a dilute chlorite anion solution.

Also, while tablets and reactors can effectively generate chlorine dioxide, once the chlorine dioxide is produced, more chlorine dioxide must be produced to sustain a desired concentration in the aqueous system. The chlorite anions resulting from the reduction of chlorine dioxide are in affect a waste of reagent. The cyclic process of the invention allows for regeneration of the chlorite anion thereby reducing the need for more chlorine dioxide production and its associated cost.

The cyclic process disclosed also allows for efficient use of reagents by utilizing a process control system to monitor and regulate the feed of the various reagents. For example, oxidation reduction potential (ORP) can be used to feed the oxidizing activator such as a free chlorine donor. A pH sensor and temperature compensation regulates feed of the acid to ensure pH operates within the specified guidelines for the specific application. An amperometric sensors or automated titration methods can be employed to monitor free halogen concentration and/or chlorine dioxide. A bromide selective ion sensor monitors and regulates feed of bromide as needed. While many variations can be derived, the technology for a process control system is available. Additional algorithms, time based proportional control, time based control and the like can be incorporated into the program logic to enhance optimization of the feed of chemicals as well as other supporting treatment such as supplemental sulfate free radical treatments like that proposed in co-pending application Ser. No. 11/598,384 filed Nov. 13, 2006, which is a continuation-in-part of application Ser. No. 11/494,228 filed Jul. 27 Jul. 2006, which is a continuation-in-part of application Ser. No. 11/226,100 filed Sep. 14, 2005, which is a continuation-in-part of application Ser. No. 11/158,676 filed Jun. 22, 2005.

Processes and Compositions of the Invention

Efficient regeneration of relatively low concentrations of selective anions at near neutral pH opens the pathway for sustaining a cyclic system resulting in recycling of substantially inert anions into powerful and effective oxidants and disinfectants. The cyclic system is achieved by the process of providing an effective amount of oxidizing activator to an aqueous solution while sustaining in said aqueous system an effective amount of bromide anions and chlorite anions. The chlorite anions are then regenerated into chlorine dioxide by oxidation from hypobromous acid.

The invention provides for compositions and a process for increasing the rate of inactivation of microbiological organisms and oxidation of oxidation resistant compounds in an aqueous system.

The disclosed process for a cyclic system of the invention reduces the use and cost of expensive precursors exemplified by sodium bromide and sodium chlorite, and further provides the benefits of synergistic oxidation and inactivation from the combined effects of multiple oxidizers in the main-body of water comprising the aqueous system, rather than a sidestream or as part of the circulating system such as when an ozone system or Ultraviolet light system is incorporated into the circulating system of a swimming pool. Therefore, the powerful effects of synergistic inactivation and oxidation as well as the benefits of the regenerative power of the cyclic system are carried out in the water where intimate contact with the contaminants is being made. This dramatically increases the efficiency of the oxidation and inactivation since lag times and system response time caused by circulation and distribution of treated water is all but eliminated.

A composition of the invention may comprise one or more of the activating oxidant, bromide anion, and chlorite anion. However, it is most desirable to apply the components in at least two separate constituents for better control and safety.

An optional barrier film for use in compositions of the invention segregates at least one of: the bromide anion exemplified by sodium bromide; chlorite donor exemplified by sodium chlorite; and the oxidizing activator exemplified by potassium monopersulfate; and where the barrier film is exemplified by magnesium carbonate and fumed silica.

The ratios of components comprising the composition can vary based on the feed rates and potential use of other free halogen donors such as sodium hypochlorite commonly used as a disinfectant in water. However, the general chemistry in an aqueous system comprising the cyclic process of the present invention will comprise: bromide anion having a concentration of 5 to 1000 ppm, and a chlorite anion concentration ranging from 0.1 to 50 ppm; and whereby the oxidizing activator is applied to the aqueous system at a rate sufficient to sustain a chlorine dioxide concentration of about 0.1 to 100.0 ppm with a pH of from about 6.0 to 8.5, more preferably from about 6.5 to 8.0, and most preferably from about 6.8 to 7.8.

The components comprising the composition of the present invention can be applied to the aqueous system as an all-in-one composition or as multiple bundled or individual components.

The microbiological organism activity controlled by the cyclic process may be: parasitic organisms such as *Cryptosporidium* and *Giardia*; bacteria; viruses; algae; fungus; and biofilms.

In some embodiments a composition for use of the invention is a free flowing powder, wherein the composition is applied by broadcasting across the surface of the pool or by decanting into a desired location of the aqueous system such as an aquatic facility's circulating system or laundry washing machine.

In another embodiment, the components may be applied as liquids such as a solution of sodium bromide and sodium chlorite and a separate solution of sodium hypochlorite.

In other embodiments, a composition of the invention is formed into a solution by contact with water then applied to a convenient location into the aqueous system such as an aquatic facility's circulating system or vegetable wash basin.

In yet other embodiments, a composition of the invention is an agglomerate that can have any convenient geometric configuration, e.g., a tablet.

A composition of the invention may be provided as separately packaged components such as a kit. This approach provides greater flexibility in optimizes the chemistry of the aqueous system such as in the case of applying a "shock" treatment comprising a higher single dose application. This approach may be preferred such as in the case of a fecal release into a swimming pool to increase the concentration of sulfate radicals to accelerate the decomposition of the excess organic contamination.

The components of a composition of the invention may be added to aqueous system separately, at the same time, or at different times to achieve the desired results.

The invention further provides methods for increasing the rate of inactivation of microbiological organisms in an aqueous solution treated with registered sanitizer comprising at least one of a free halogen donor and chlorine dioxide.

Various embodiments of the disclosed compositions of the invention can be applied as shock treatments to recover a contaminated aqueous system, and/or fed while the contaminants are being added to the aqueous system.

Methods of treating water in an aqueous system to enhance the rate of inactivation of oxidation resistant microbiological organisms and decomposition of organic contaminants are disclosed. Without limiting the applications, examples of an aqueous system may be an: aquatic facility, agricultural processes such as washing of vegetables, poultry washing basins, or laundry washing.

Powder compositions can be all-in-one treatments or be any combination of components which are then applied together or separately. In many applications such as treatment of aquatic facilities it would be desirable to utilize two or more components for reasons of safety as well as flexibility of treatments to accommodate the variations is facility design and requirements.

Barrier films such as magnesium carbonate sold under the trade name Elastocarb™ by Akrochem have very low bulk density thereby increasing the segregation of constituents in the composition for a given weight percentage of Elastocarb™ more so than high density compounds like magnesium sulfate heptahydrate. By volume comparison, it take about 15 wt % of magnesium carbonate to provide the amount of segregation than the magnesium sulfate heptahydrate. Furthermore, upon exposure to temperatures of about 200 degrees celcius, the Elastocarb™ releases both water and carbon dioxide in an endothermic (energy consuming) reaction, thereby cooling the reaction while the released vapors displace the fuel from the surface. Combining magnesium carbonate into the composition not only improves the stability of the composition, it can improve the processing, packaging, shipping, storage, and handling of the final product by making it less reactive.

Furthermore, barrier films need not be added during the processing of the composition. They can be added to one or more of the components of the composition as part of that components manufacturing process. Potassium monopersulfate for example is typically treated with magnesium carbonate to coat the granules and function as an anti-caking agent so that the resulting product is free flowing (reference U.S. Pat. No. 7,090,820B). Additional barrier film can be applied such as in cases of combined the potassium monopersulfate with sodium bromide and sodium chlorite.

All-in-one compositions can be better stabilized by applying Fumed silica having either a hydrophilic or hydrophobic characteristics using a magnetic assisted impaction coater (MAIC). Magnesium carbonate is also a suitable coating. This method of coating also can reduce the NFPA (National Fire Protection Association) classification of the treatment thereby allowing for reduced DOT and storage requirements due to its reduced reactivity.

The fumed silica can be applied either as a liquid or as a power.

Unlike mechanical mixing such as V shaped blender or ribbon mixer, the use of MAIC provides for a coating having improved distribution and adherence onto the substrate, thereby improving protective features of the coating.

Some embodiments of the composition can be packaged as a ready to use kit for application to aquatic facilities after release of a bodily discharge (i.e. fecal, vomit, blood etc.). The kit can include pre-measured doses of the various compositions, pre-measured doses in one-time use polyvinyl alcohol sacks or bags, or comprise a supply of composition for multiple applications.

The compositions of the invention can be applied using commercially available feed systems that dissolve either powders, granules or tablets of the compositions to form a solution, then dispensing the solution into the water to be treated. Examples of such feed systems include but are not limited to Polaris Watermatic G1000, Watermatic G7500, Pulsar II, III, and IV Calcium Hypochlorite feed systems, as well as various erosion feeders for feeding bromine and chlorine tablets.

Also, the composition of the invention can be applied directly to the water to be treated by decanting or broadcasting the composition into or across the surface of the water.

Another useful variation of operating the cyclic process is applying liquid forms of the various regents. For example sodium hypochlorite can be the oxidizing activator, liquid sodium bromide and liquid sodium chlorite can be applied either separately or potentially as a combined liquid solution. Simple metering pumps can be employed to control the feed rate of reagents.

It is anticipated that various modifications to the disclosed processes for increasing the rate of oxidation and inactivation of resistant compounds and organisms can be achieved while remaining within the scope of the invention. For example, water treated with the compositions and process of the cyclic system can be irradiated with ultra violet radiation to further inactivation of microbiological organisms. Ozone can also be added to the treated system to enhance oxidation and inactivation of microbiological organisms.

Example 1

To 500 ml of city tap water, a 6% solution of sodium hypochlorite was added to achieve approximately 4.4 ppm as $Cl_2$. From a stock solution of sodium chlorite, 1.14 ppm as $ClO_2^-$ was added to the solution and the pH was adjusted using sodium bisulfate. At time equals 1 minute, the pH was 7.37. At time equals 10 minutes the pH was 7.44. A 25 ml sample was taken and treated with DPD followed by titration with thiosulfate standardized solution. Total Free measured approximately 4.6 ppm as $Cl_2$. A 50 ml sample was taken and treated with Glycine followed by DPD and titrated with thiosulfate stnd solution. The result indicated 0.1 ppm as $Cl_2$ of chlorine dioxide. The remainder of the treated solution was then treated with sodium bromide to obtain 20 ppm as $Br^-$. The sample was treated with sodium bisulfate to stabilize the pH. After a lapsed time of 8 minutes, a 25 ml sample was taken and tested using DPD which indicated 4.0 ppm as $Cl_2$. A 50 ml sample was taken a treated with glycine followed by DPD. The result indicated 1.0 ppm as $Cl_2$.

Example 2

To 500 ml of city tap water, 0.08 grams sodium bicarbonate was added to buffer the pH. 100 ppb as $CO_2^+$ was added along with 100 ppm as $Br^-$ and 1.18 ppm as $ClO_2^-$. After 2 minutes of mixing with a magnetic stirrer, 24 ppm of potassium monopersulfate was added to the system. At time equals 3 minutes the pH was 7.26. At time equals 10 minutes the pH was 7.36. Two 25 ml samples were taken. Sample 1 was tested using DPD followed by KI which indicated a total free of 3.8 ppm as $Cl_2$ and a total of 4.2 ppm as $Cl_2$. Sample 2 was treated with glycine followed by DPD, the sample resulting in a chlorine dioxide of 1.2 ppm as $Cl_2$.

Discussion of Examples

It is clearly evident that the efficiency of chlorine dioxide generation from chlorite anions at near neutral pH by converting bromide anions into hypobromous acid followed by conversion of dilute solutions of chlorite anions to chlorine dioxide is many times higher than that achieved by using hypochlorous acid. Also other oxidants such as potassium monopersulfate as well as sulfate free radicals effectively produce hypobromous acid resulting in the same transformation of chlorite to chlorine dioxide.

Furthermore, depending on the concentration of bromide anions present in the aqueous system, and the resulting residual of hypobromous acid, it is apparent that the efficiency of chlorite anion conversion to chlorine dioxide is directly related to the hypobromous acid concentration. Also the concentration of hypobromous acid in a chlorine-bromide system is dependent on the molar ratio of bromide to free chlorine. As a result it is crucial to sustain sufficient bromide anion to effectively drive the reaction by sustaining effective residual of hypobromous acid. Therefore, as long as a sufficient residual of bromide anion is achieved and oxidizing activator is applied to provide the desired free bromine residual, the conversion of dilute solutions of chlorite anions at near neutral pH to chlorine dioxide can approach 100%.

As a result, the cyclic process provides a means of using chlorite donors such as alkali metal salts of chlorite while operating the system substantially free of chlorite even when the potential for concentrating the chlorite exist.

Review of the Invention's Benefits

This process allows for a cyclic process that regenerates chlorite anions that would otherwise be an undesirable waste product, and which may limit the feed of chlorine dioxide due to the limitations of chlorite anions allowed in some waters due to potential health risk. Furthermore with respect to the application of chlorine dioxide, the cyclic process regenerates the chlorite anions in-situ to the application thereby helping sustain a desired chlorine dioxide concentration resulting in reduced feed of chlorine dioxide and/or allowing for higher sustained concentrations.

The disclosed cyclic process eliminates the need for generating chlorine dioxide using techniques that require high concentrations such as a chlorine dioxide generator and tablets without compromising efficiency in conversion of chlorite anions to chlorine dioxide.

Yet another significant benefit is the ability to sustain treatment of a recirculating aqueous system with chlorine dioxide while the aqueous system remains substantially free of chlorite anions.

It is claimed:

1. A cyclic process for the in-situ generation of chlorine dioxide from a dilute solution of chlorite anions in a recirculating aqueous system treated with a chlorite anion donor, and wherein the said aqueous system remains substantially free of chlorite anions, the process comprising:

addition of an activating oxidant selected from at least one of a free halogen donor comprising at least some portion of free chlorine and peroxymonosulfate donor to the said aqueous system; and sustaining in said aqueous system a bromide anion concentration from about 10 ppm to 1000 ppm by addition of an alkali metal salt of bromide, a chlorite anion concentration necessary to sustain from about 0.2 to 1.0 ppm as chlorine dioxide by addition of an alkali metal salt of chlorite, and a pH of between about 6.8 to 8.0; whereby the activating oxidant reacts with the bromide anion to sustain a free bromine concentration from about 1.5 to 25 ppm reported as $Br_2$, subsequent reaction of the free bromine with the chlorite anion to produce chlorine dioxide; and wherein at least some portion of the recovered bromide anions and chlorite anions resulting from the reduction of free bromine and chlorine dioxide are recycled in the cyclic process.

2. The process of claim 1, wherein the recirculating aqueous system is an aquatic facility.

3. The process of claim 1, wherein the recirculating aqueous system is a cooling tower.

4. The process of claim 1, wherein the recirculating aqueous system is a poultry washing system.

5. The process of claim 1, wherein the recirculating aqueous system is a vegetable washing system.

6. A cyclic process for the in-situ generation of chlorine dioxide from a dilute solution of chlorite anions in a recirculating aqueous system treated with a chlorite anion donor, and wherein the said aqueous system remains substantially free of chlorite anions, the process comprising:

addition of an activating oxidant comprising peroxymonosulfate donor to the said aqueous system; and sustaining in said aqueous system a bromide anion concentration from about 5 ppm to 500 ppm, a chlorite anion concentration necessary to sustain from about 0.2 to 1.0 ppm as chlorine dioxide by addition of an alkali metal salt of chlorite, and a pH of between about 6.8 to 8.0; whereby the activating oxidant reacts with the bromide anion to sustain a free bromine concentration from about 0.5 to 25 ppm reported as $Br_2$, subsequent reaction of the free bromine with the chlorite anion to produce chlorine dioxide; and wherein at least some portion of the recovered bromide anions and chlorite anions resulting from the reduction of free bromine and chlorine dioxide are recycled in the cyclic process.

7. The process of claim 6, wherein the recirculating aqueous system is an aquatic facility.

8. The process of claim 6, further comprising sustaining from about 10 to 500 ppb measured as elemental metal of a transition metal catalyst that converts some portion of the peroxymonosulfate donor to sulfate free radicals.

9. The process of claim 8, wherein the transition metal catalyst comprises cobalt.

10. The process of claim 8, wherein the transition metal catalyst comprises ruthenium.

11. The process of claim 8, wherein the transition metal catalyst comprises iron.

12. The process of claim 6, further comprising addition of a chelating agent.

13. A cyclic process for the efficient conversion of a dilute solution of chlorite anions to chlorine dioxide in an aqueous system for enhanced inactivation of microbiological organisms, the process comprising:

addition of an activating oxidant selected from at least one of a free halogen donor comprising some portion of free chlorine and peroxyxnonosulfate donor to the aqueous system; and sustaining in said aqueous system a bromide anion concentration from about 5 ppm to 1000 ppm, a chlorite anion concentration necessary to sustain from about 0.2 to 20 ppm as chlorine dioxide by addition of an alkali metal salt of chlorite, and a pH of between about 6.0 to 8.5; whereby the activating oxidant reacts with the bromide anion to sustain a free bromine concentration from about 0.5 to 50 ppm reported as $Br_2$, subsequent reaction of the free bromine with the chlorite anion to produce chlorine dioxide while sustaining a residual chlorite anion concentration of no greater than 50 wt % of the concentration of measured chlorine dioxide; and wherein at least some portion of the recovered bromide anions and chlorite anions resulting from the reduction of free bromine and chlorine dioxide are recycled in the cyclic process.

14. The process of claim 13, wherein the aqueous system is a cooling tower system.

15. The process of claim 13, wherein the aqueous system is a laundry washing machine.

16. The process of claim 13, wherein the aqueous system is a vegetable washing system.

17. The process of claim 13, wherein the aqueous system is a poultry washing system.

* * * * *